United States Patent [19]

Yokooku

[11] 4,433,654
[45] Feb. 28, 1984

[54] KNOCK CONTROL DEVICE FOR INTERNAL COMBUSTION ENGINE

[75] Inventor: Katsuhiko Yokooku, Hiroshima, Japan

[73] Assignee: Toyo Kogyo Co., Ltd., Tokyo, Japan

[21] Appl. No.: 407,552

[22] Filed: Aug. 12, 1982

[30] Foreign Application Priority Data

Aug. 25, 1981 [JP] Japan .................................. 56-132930

[51] Int. Cl.$^3$ ............................................. F02D 37/02
[52] U.S. Cl. ...................................... 123/425; 123/421; 123/435; 123/489
[58] Field of Search ............... 123/425, 421, 435, 440, 123/489, 589; 60/285

[56] References Cited

U.S. PATENT DOCUMENTS

| | | | |
|---|---|---|---|
| 4,144,853 | 3/1979 | Maruoka et al. | 123/421 |
| 4,236,491 | 12/1980 | Hattori et al. | 123/425 |
| 4,282,841 | 8/1981 | Takagi et al. | 123/425 |
| 4,314,534 | 2/1982 | Nakajima et al. | 123/435 |
| 4,319,451 | 3/1982 | Tajima et al. | 123/489 |

FOREIGN PATENT DOCUMENTS 56-27066 3/1981 Japan .

Primary Examiner—Andrew M. Dolinar
Attorney, Agent, or Firm—Gerald J. Ferguson, Jr.; Joseph J. Baker

[57] ABSTRACT

A knock control device having a knock detecting means and an ignition timing control means is provided with a temperature sensor for detecting the temperature of the exhaust system of an internal combustion engine. If the knock detecting means detects occurrence of knock when the temperature of the exhaust system is lower than a predetermined value, the ignition timing control means retards the ignition timing by a first angle which is most desirable for suppressing the knock, while if the knocking detecting means detects occurrence of knock when the temperature of the exhaust system is not lower than the predetermined value, then the ignition timing control means retards the ignition timing by a second angle which is smaller than the first angle.

6 Claims, 2 Drawing Figures

KNOCK CONTROL DEVICE FOR INTERNAL COMBUSTION ENGINE

BACKGROUND OF THE INVENTION

1. Field of the Invention

This invention relates to a knock control device for an internal combustion engine in which the ignition timing of the engine is retarded in response to occurrence of knock, and more particularly to such a knock control device in which the exhaust system of the engine is prevented from being heated to an abnormally high temperature when the ignition timing is retarded in response to occurrence of knock.

2. Description of the Prior Art

As is well known in the art, it is generally desired that the ignition timing of an internal combustion engine be set at a point to obtain so-called MBT (Minimum advance for Best Torque) from the points of engine efficiency and fuel consumption. This point will be simply referred to as the "MBT point" hereinafter. However, if the ignition timing is advanced toward the MBT point under certain engine conditions, knock occurs before the MBT point is reached. Knock is apt to occur when the engine is operated at a low speed and under a heavy load, especially in an engine provided with a supercharger. Knock can be prevented by setting the ignition timing at a point immediately behind the knocking limit. However, since the knocking limit depends upon not only the ignition timing but also the air to fuel ratio and/or the atmospheric conditions such as the environmental temperature, the ignition timing has usually been set at a point substantially behind the MBT point in order to ensure that knock does not occur anywhere over the entire range of operational conditions. Accordingly, for some operational conditions the retardation of the ignition timing becomes much more than necessary for preventing knock, which is not desirable from the points of engine efficiency and fuel consumption.

Thus, there has been proposed a system in which the ignition timing is set immediately behind the knocking limit and means for suppressing knock is actuated when a knock detecting means detects occurrence of knock.

When knock occurs in an internal combustion engine, the knock is typically suppressed by reducing the charging efficiency by closing the throttle valve or, in case of an engine provided with a supercharger, by lowering the supercharging pressure; by lowering the air to fuel ratio; in case of an engine provided with an EGR (Exhaust Gas Recirculation) system, by increasing the amount of the recirculation exhaust gas; or by retarding the ignition timing. The last method is advantageous over the other three methods in view of the quickness in response. The other three methods are slow in response since they control flow of a fluid, i.e., the exhaust gas or the air/fuel mixture.

Various systems for carrying out the last method are disclosed in Japanese Unexamined Patent Application No. 56(1981)-27066, U.S. Pat. No. 4,236,491 and U.S. Pat. No. 4,282,841, for example, and generally comprise an ignition timing controlling circuit which detects the rotational speed of the engine or the load imparted thereto to determine the ignition timing, and a knocking detecting circuit having a knock sensor connected to the ignition timing controlling circuit. The knock detecting circuit generates a retarding signal when the knock sensor detects knock and inputs it into the ignition timing controlling circuit which retards the ignition timing by a predetermined angle upon receipt of the retarding signal. This system is quick in response since no behavior of fluid is involved in the controlling system thereof. As is well known in the art, knock of an engine can be detected from the vibration or sound of the engine, and the knock sensor may comprise, for example, a piezoelectric element which detects occurrence of knock through vibration of the engine.

However, said system is disadvantageous in that when the ignition timing is retarded, the combustion gas is apt to burn in the exhaust manifold after being discharged from the combustion chamber, that is, an afterburning phenomenon is apt to occur, whereby the temperature of the exhaust gas is significantly elevated. If the temperature of the exhaust gas becomes abnormally high, there arises a possibility of the exhaust pipe being damaged, the catalyst for cleaning the exhaust gas being fused or, if the engine is provided with a supercharger, the supercharging turbine being damaged.

SUMMARY OF THE INVENTION

In view of the foregoing observations and description, the primary object of the present invention is to provide a knock control device for an internal combustion engine which is able to suppress knock of the engine with a quick response without abnormally elevating the temperature of the exhaust gas.

In accordance with the present invention, a temperature sensor is provided for detecting the temperature of the exhaust system and when knock occurs the ignition timing is retarded with respect to the ordinary retardation by different angles depending on the temperature of the exhaust system. Typically, if knock occurs when the temperature of the exhaust system is lower than a predetermined value, the ignition timing is retarded by a first angle which is most desirable for suppressing the knock, while if knock occurs when the temperature of the exhaust system is not lower than the predetermined value, then the ignition timing is retarded by a second angle which is smaller than the first angle. If desired, the second angle may be continuously changed depending on the temperature of the exhaust system.

The knock control device of the present invention can rapidly suppress knock of the engine since it suppresses the knock by retarding the ignition timing but can, nevertheless, prevent the exhaust system from being excessively heated by reducing the retarding angle for suppressing the knock when the temperature of the exhaust system is high and thereby repressing after-burning.

When the retarding angle is reduced, the knock suppressing effect is conspicuously lowered. Therefore, an additional knock suppressing means which does not elevate the temperature of the exhaust system is preferably provided so as to be actuated when the ignition timing is to be retarded by said second angle, i.e., when knock occurs when the temperature of the exhaust system is high.

DESCRIPTION OF THE PREFERRED EMBODIMENT

Figure 1:
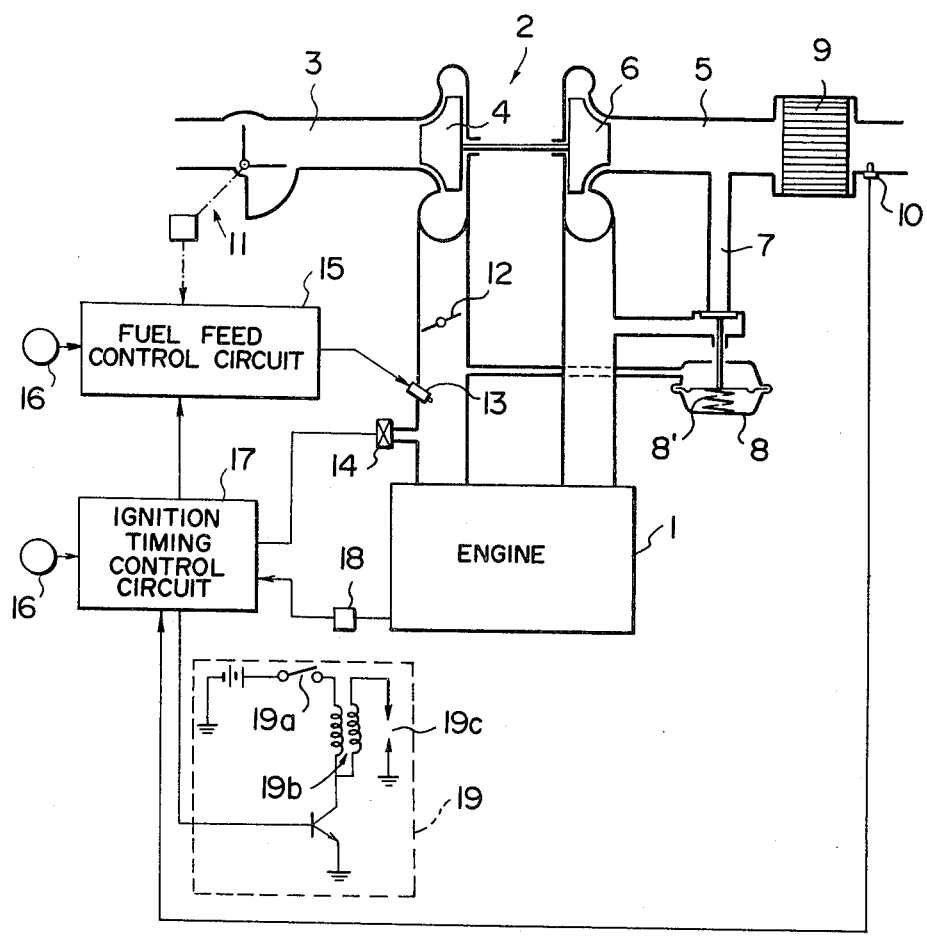
FIG. 1 is a schematic view showing an internal combustion engine provided with a knock control device in accordance with an embodiment of the present invention together with components associated therewith.

In FIG. 1, an internal combustion engine 1 is provided with a fuel injecting device and a turbosupercharger 2. A blower 4 of the turbosupercharger 2 is disposed in an intake passage 3, while a turbine 6 is disposed in an exhaust passage 5. To the exhaust passage 5 is connected a by-pass passage 7 which is normally closed by a waste gate valve 8. As can be seen from FIG. 1, the waste gate valve 8 opens the by-pass passage 7 when the supercharging pressure becomes higher than a predetermined value to permit a part of the exhaust gas to by-pass the turbine 6 through the by-pass passage 7, whereby the maximum supercharging pressure is held constant. In the exhaust passage 5 is provided a catalyst 9 for cleaning the exhaust gas and a temperature sensor 10 for detecting the temperature of the exhaust system is disposed downstream of the catalyst 9. An air flow sensor 11 for detecting the amount of intake air is disposed in the intake passage 3 upstream of the blower 4 and a throttle valve 12 which is normally actuated through an accelerator pedal (not shown) is disposed downstream of the blower 4. Further, a fuel injecting nozzle 13 of said fuel injecting device and a pressure sensor 14 for detecting the intake suction are disposed downstream of the throttle valve 12. A fuel feed control circuit 15 controls the fuel injecting nozzle 13 so that an optimum amount of fuel calculated from the amount of intake air detected by the air flow sensor 11 and the rotational speed of the engine 1 detected by an engine rpm sensor 16 is injected into the intake system for each cycle. The fuel feed control circuit 15 differs from the conventional one in that it is arranged to change the amount of fuel to be injected upon receipt of a signal from an ignition timing control circuit 17 as will be described in more detail hereinbelow. The ignition timing control circuit 17 determines the optimum ignition timing according to the intake suction detected by the pressure sensor 14 and the rotational speed of the engine 1 detected by the engine rpm sensor 16, and also controls the igniting circuit 19 to retard the ignition timing when occurrence of knock is detected by a knock sensor 18 which may comprise a piezoelectric element, for example.

Figure 2:
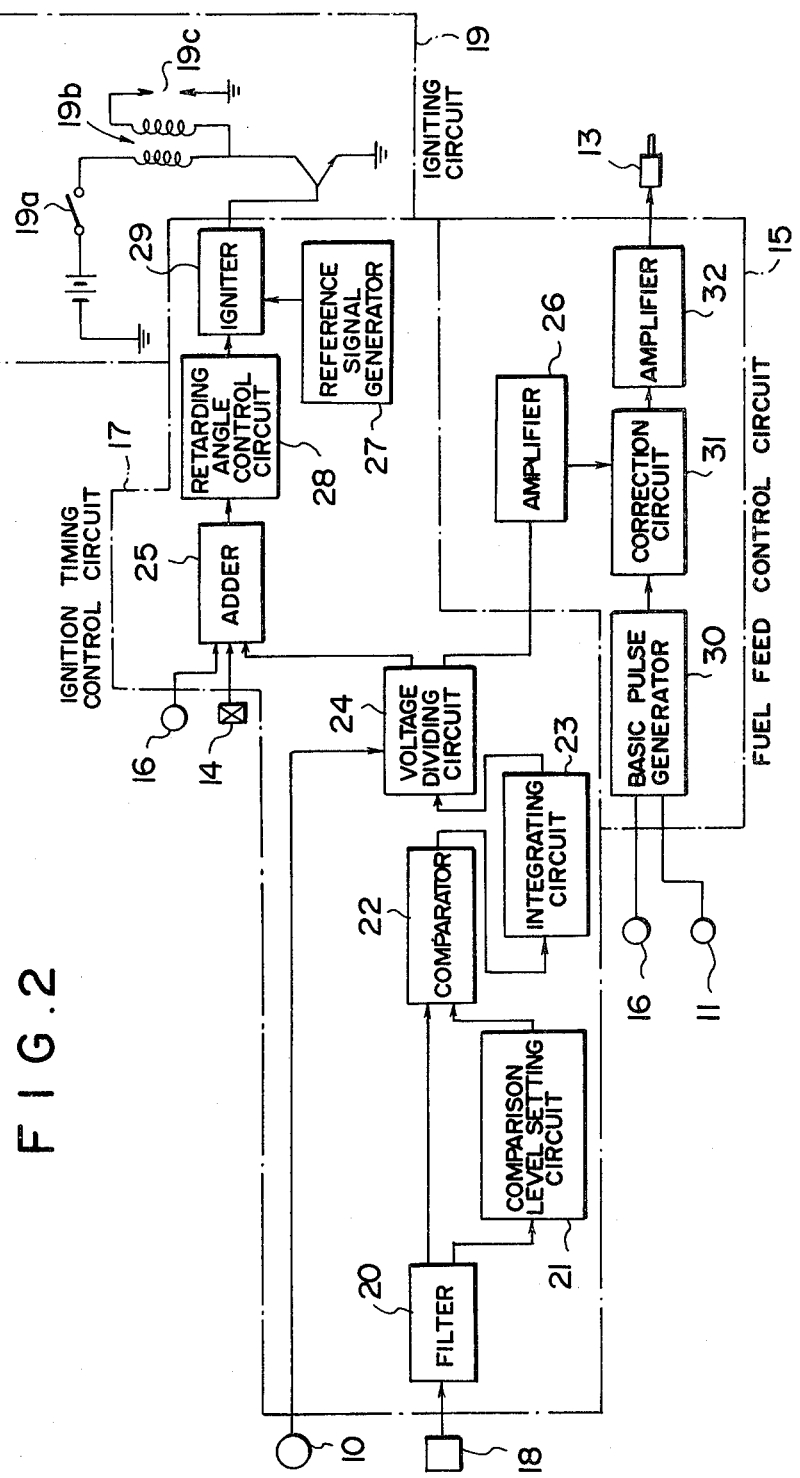
FIG. 2 is a block diagram showing the knock control device of FIG. 1 in more detail.

Now referring to FIG. 2, the fuel feed control circuit 15 and the ignition timing control circuit 17 will be described in more detail. Vibration signals outputted from the knocking sensor 18 and passes through a filter 20 which only transmits vibration signals having particular frequencies of combustion knock, whereby components having frequencies other than combustion knock are eliminated. The vibration signals transmitted through the filter 20 are compared with a constant level signal outputted from a comparison level setting circuit 21 by a comparator 22 and components having a level higher than that of the constant level signal are picked up as a knock signal. The knock signal is inputted into an integrating circuit 23 and the integrated output thereof is inputted into a voltage dividing circuit 24. The voltage dividing circuit 24 receives the output of the temperature sensor 10 indicative of a temperature of the exhaust system. When the temperature of the exhaust system is lower than a predetermined value, the voltage dividing circuit 24 inputs the whole integrated knock signal into an adder 25, otherwise the voltage dividing circuit 24 divides the voltage of the integrated knock signal and inputs a part thereof into an amplifier 26 of the fuel feed control circuit 15.

The igniting circuit 19 comprises an ignition switch 19a, an ignition coil 19b and a spark plug 19c, and repeatedly generates ignition sparks under the control of an igniter 29 which determines the ignition timing depending on a synchronizing pulse outputted from a reference signal generator 27 corresponding to the rotational speed of the engine 1 and a retarding signal outputted from a retardation control circuit 28. When no knock occurs, only the outputs of the engine rpm sensor 16 and the pressure sensor 14 and inputted into the retardation control circuit 28 through the adder 25, and accordingly the igniter 29 actuates the igniting circuit 19 with the optimum retardation derived from the rpm of the engine and the intake suction. When knock occurs, a knock signal is inputted into the adder 25 from the voltage dividing circuit 24 in addition to the outputs of the engine rpm sensor 16 and the pressure sensor 14. Accordingly, the retarding signal from the retardation control circuit 28 is enlarged according to the level of the knock signal inputted into the adder 25, whereby the retardation of the output of the igniter 29 is increased by an angle corresponding to the level of the knock signal inputted into the adder 25. The knock of the engine 1 is thus suppressed by retarding the ignition timing from that which would be optimum without the knock.

As described above, when the temperature of the exhaust system is lower than the predetermined value, the whole output of the integrating circuit 23 is inputted into the adder 25, while when the temperature of the exhaust system is not lower than the predetermined value, only a part of the output of the integrating circuit 23 is inputted into the adder 25. Therefore, the angle of retardation set for suppressing knock when the temperature of the exhaust system is lower than the predetermined value is larger than that set for suppressing knock when the temperature of the exhaust system is not lower than the predetermined value.

By making the retardation angle for suppressing knock small when the temperature of the exhaust system is high, it is possible to repress after-burning, thereby preventing the exhaust system from being heated to an abnormally high temperature. However, this inherently lowers the knock suppressing effect. Therefore, in this particular embodiment, said fuel feed control circuit 15 is arranged to serve as an additional knock suppressing means when the temperature of the exhaust system is high, i.e., when the retardation angle for suppressing knock must be small.

The fuel feed control circuit 15 includes a basic pulse generator 30 which receives signals from the engine rpm sensor 16 and the air flow sensor 11, respectively indicative of the rotational speed of the engine 1 and the amount of the intake air, and generates a fuel injection pulse according to the amount of the intake air for each cycle. The fuel injection pulse outputted from the basic pulse generator 30 is delivered to the fuel injecting nozzle 13 by way of a correction circuit 31 and an amplifier 32. When no knock occurs or when knock occurs when the temperature of the exhaust system is lower than the predetermined value, the output of the integrating circuit 23 is not inputted into said amplifier 26, and accordingly no correction is effected in the correction circuit 31, whereby the fuel injection pulse is inputted into the fuel injection nozzle 13 through the amplifier 32 without being corrected. Therefore, an optimum amount of fuel with respect to the amount of intake air is injected from the nozzle 13 for each cycle. On the other hand, when knock occurs with the temperature of the exhaust system being not lower than the predetermined value, a part of the output of the integrating circuit 23 is inputted into the amplifier 26 by way of the voltage dividing circuit 24 as described above. When the output of the amplifier 26 is inputted into the correction circuit 31, the correction circuit 31 corrects the fuel injection pulse to increase the amount of fuel to be injected. The air to fuel ratio is thus reduced to compensate for the reduction of the knock suppressing effect due to the reduction of the retardation angle for suppressing knock.

Although not essential, it is preferable to provide additional means for suppressing knock when the retardation angle must be small. The additional means is not limited to the one described in the above embodiment. For example, the additional knock suppressing may be effected by lowering the charging efficiency by throttling the throttle valve or by weakening the spring 8' (FIG. 1) of the waste gate valve 8 in the supercharging operating range of the engine 1. In the case of an engine having an EGR system, the additional knock suppression can be effected by increasing the amount of the recirculated exhaust gas.

Further, the retardation angle by which the ignition timing is retarded when the temperature of the exhaust system is not lower than the predetermined value may be changed depending on the temperature of the exhaust system. This can be effected in the above embodiment by changing the voltage dividing ratio of the voltage dividing circuit 24.

I claim:

1. A knock control device for an internal combustion engine having a combustion chamber with a spark plug, an intake system for introducing intake gas into the combustion chamber and an exhaust system for discharging exhaust gas therefrom comprising a knock detecting means for detecting occurrence of knock in the internal combustion engine, a temperature sensor for detecting the temperature of the exhaust system, and an ignition timing control means which receives the outputs of the knock detecting means and the temperature sensor, and is arranged to further retard the ignition timing by a first angle when knock occurs when the temperature of the exhaust system is lower than a predetermined value, and to further retard the ignition timing by a second angle smaller than the first angle when knock occurs when the temperature of the exhaust system is not lower than the predetermined value.

2. A knock control device as defined in claim 1 further comprising an additional knock suppressing means which does not substantially elevate the temperature of the exhaust system and which is actuated when knock occurs when the temperature of the exhaust system is not lower than the predetermined value.

3. A knock control device as defined in claim 2 in which said additional knock suppressing means comprises an air to fuel ratio correcting means for increasing the air to fuel ratio to suppress the knock.

4. A knock control device as defined in claim 1 in which said knock detecting means includes a knock sensor for detecting vibration of the engine caused by knock, and said ignition timing control means includes a comparator which compares the output of the knock sensor with a reference value and outputs a signal when the former is not lower than the latter, an integrating circuit for integrating the output signal of the comparator, a voltage dividing circuit for dividing the voltage of the output of the integrating circuit depending on the output of said temperature sensor, and a circuit for controlling the retardation of the ignition timing.

5. A knock control device as defined in claim 4 which further comprises an air to fuel ratio correcting means for correcting the air to fuel ratio depending on the output of the voltage dividing circuit.

6. A knock control device as defined in claim 3 or 5 in which said air to fuel ratio correcting means includes a pulse correcting circuit which corrects the air to fuel ratio by correcting a pulse signal from a pulse generating circuit for controlling the amount of fuel to be injected from a fuel injection nozzle.

* * * * *